United States Patent [19]
Anderson et al.

[11] 4,363,790
[45] Dec. 14, 1982

[54] DESULFURIZATION OF $H_2S$ CONTAINING GAS STREAMS WITH PRODUCTION OF ELEMENTAL SULFUR

[75] Inventors: Gerald L. Anderson, Romeoville; Harley A. Borders, Berwyn; F. Otis Berry, Bellwood, all of Ill.

[73] Assignee: Institute of Gas Technology, Chicago, Ill.

[21] Appl. No.: 292,422

[22] Filed: Aug. 14, 1981

[51] Int. Cl.$^3$ .............................................. B01D 53/04
[52] U.S. Cl. .................................. 423/230; 423/573 R
[58] Field of Search ............... 423/110, 230, 571, 573; 55/73

[56] References Cited

U.S. PATENT DOCUMENTS

| | | | |
|---|---|---|---|
| 2,259,400 | 10/1941 | Wenzel et al. | 423/110 |
| 2,551,905 | 5/1951 | Robinson | 423/230 |
| 2,772,945 | 12/1956 | Dunning et al. | 423/573 |
| 4,008,174 | 2/1977 | Jacobson et al. | 423/230 X |
| 4,088,736 | 5/1978 | Courty et al. | 423/230 |
| 4,263,020 | 4/1981 | Eberly, Jr. | 55/73 X |

FOREIGN PATENT DOCUMENTS 914398  1/1963  United Kingdom ................ 423/230

Primary Examiner—G. O. Peters
Attorney, Agent, or Firm—Thomas W. Speckman

[57] ABSTRACT

A process is disclosed for desulfurization of gas streams by which reduced sulfur compound, such as $H_2S$, is reacted with solid sulfur removal metal oxide compound which is an oxide of chromium, combination of zinc and chromium, combination of zinc and aluminum and mixtures thereof at about 400° to about 1600° F. producing sulfided sulfur removal compound followed by regeneration of the sulfided compound by contact with oxygen containing gas at temperatures about 1400° to about 2400° F. to regenerate the sulfur removal metal oxide compound with at least 10 weight percent of the sulfur removed being in the form of elemental sulfur. The process does not consume valuable fuels, such as coke or fuel gases, and provides an environmentally acceptable off-gas with reduced amounts of $SO_x$.

20 Claims, No Drawings

DESULFURIZATION OF H₂S CONTAINING GAS STREAMS WITH PRODUCTION OF ELEMENTAL SULFUR

BACKGROUND OF THE INVENTION

1. Field of the Invention

This invention relates to a process for desulfurization of gas streams, such as fuel gas streams, containing $H_2S$. The process is particularly suited to high temperature gas streams containing reduced sulfur, such as hydrogen sulfide, wherein the amount of sulfur oxides produced in its removal is reduced, providing an environmentally acceptable off-gas without the consumption of large amounts of energy. The process of this invention utilizes specific solid sulfur removal metal oxide compounds which become sulfided upon removal of hydrogen sulfide from the gas stream and may be regenerated by high temperature oxygen containing gas to result in a substantial portion of the sulfur removed being in the form of elemental sulfur.

2. Description of the Prior Art

Various prior art methods have used oxides of iron, magnesium, calcium and zinc to remove sulfur containing substances, such as hydrogen sulfide, from gas streams at elevated temperatures by chemical reaction. The sulfided metal oxides have then been regenerated by reaction with an oxygen containing gas stream at elevated temperature. However, the regeneration process has generally resulted in off-gases in which the sulfur is primarily in the form of sulfur dioxide, which is environmentally unacceptable. Gas treatment techniques available for removal of sulfur dioxide from such off-gases are available, but substantially increase the cost of the sulfur removal process and consume large amounts of energy.

The desirability of higher elemental sulfur yield from the regeneration of sulfided materials with oxygen containing gases has previously been recognized and attempts have been made to increase the elemental sulfur yield by addition of a reducing agent such as coke, subsequent treatment of the $SO_2$ containing gas stream with fuel gases over suitable catalyst, and controlling the amount of oxygen admitted during regeneration so that incomplete oxidation of the sulfided material occurs and secondary reactions between the $SO_2$ and the remaining sulfided masses were encouraged to proceed forming elemental sulfur.

Controlled oxidation of sulfide ores is taught by Australian Pat. No. 157,940 wherein the formation of elemental sulfur is taught to be enhanced by incomplete oxidation of the sulfided material, pyrite containing ores and zinc sulfide containing ores forming about 1 percent elemental sulfur based upon the amount of sulfur in the product gas.

SUMMARY OF THE INVENTION

This invention relates to a process for desulfurization of gas streams containing reduced sulfur with the production of elemental sulfur. Any reduced sulfur ($S^{2-}$) containing gas stream is suitable for the process of this invention, such as $H_2S$, $COS$, $CS_2$, $C_4H_4S$ and other inorganic and organic reduced sulfur compound containing gas streams and mixtures of such reduced sulfur compounds in a gas stream. The reduced sulfur containing gas stream is passed in contact with solid sulfur removal metal oxide compound selected from the group consisting of oxides of chromium, combination of zinc and chromium, combination of zinc and aluminum, and mixtures thereof, at temperatures of about 400° to about 1600° F. for reaction of the reduced sulfur with the sodium metal oxide producing sulfided sulfur removal compound. The sulfided compound is regenerated by contacting it with an oxygen containing gas stream at temperatures about 1400° to 2400° F. producing the sulfur removal metal oxide compound for reaction with reduced sulfur containing gas. At least 10 weight percent of the sulfur removed in the regeneration is in the form of elemental sulfur. The above named sulfur removal metal oxide compounds may be used in combination with other sulfur removal metal oxide compounds. It is preferred that the above named solid sulfur removal metal oxide compounds react with greater than about 65 mole percent of the hydrogen sulfide present in the gas stream and that upon regeneration at least about 30 weight percent of the sulfur removed is in the form of elemental sulfur.

Accordingly, it is an object of this invention to provide a process for reduced sulfur compound removal which does not consume valuable fuels, such as coke or fuel gases.

It is another object of this invention to provide a process for desulfurization of hydrogen sulfide containing gas streams by reaction with solid sulfur removing metal oxide compounds and wherein regeneration produces greater elemental sulfur yield than previously obtained by processes which control rate of oxidation.

It is yet another object of this invention to provide a process for desulfurization of reduced sulfur compound containing gas streams providing an environmentally acceptable form of off-gas upon regeneration of the desulfurization material.

It is still another object of this invention to provide a process for desulfurization of reduced sulfur containing gas streams by reaction with solid sulfur removal metal oxide material, and wherein upon regeneration at least about 30 weight percent of the sulfur removed is in the form of elemental sulfur.

DESCRIPTION OF THE PREFERRED EMBODIMENTS

This invention relates to removal of sulfur containing compounds from a gas stream by reacting with a solid sulfur removal metal oxide compound selected from the group consisting of oxides of chromium, combination of zinc and chromium, combination of zinc and aluminum, and mixtures thereof. Preferred metal oxide compounds are chromia ($Cr_2O_3$), zinc chromite ($ZnCr_2O_4$), zinc aluminate ($ZnAl_2O_4$) and mixtures thereof. These compounds can be readily derived from solids containing the desired metals by calcining at high temperatures in the presence of oxygen containing gas. The above named solid metal oxide compounds may be used in conjunction with a second solid sulfur removal metal oxide compound such as alumina, zinc oxide, iron oxide, magnesium oxide, calcium oxide and mixtures thereof, wherein the above named oxides of chromium, a combination of zinc and chromium and combination of zinc and aluminum are present in greater than a 2 to 1 mole ratio with the second solid sulfur removal metal oxide compound. When two such types of solid sulfur removal metal oxide compounds are used, they may be in the form of separate discreet solids and mixed to form a mixed solids bed through which the gas stream of hydrogen sulfide containing gas is passed. The oxides of chromium, a combination of zinc and chromium, and a combination of zinc and aluminum may be incorporated directly into a second solid sulfur removal metal oxide compound by any suitable means, such as precipitation from salt solutions followed by calcination and used as a single bed of solids. In each case the oxides of chromium, a combination of zinc and chromium, and a combination of zinc and aluminum should be present in greater than a 2 to 1 Molar ratio with the second solid sulfur removal metal oxide compound to obtain desired elemental sulfur production upon regeneration. The different types of solid sulfur removal metal oxide compounds may be physically arranged in separate beds, preferably with the bed of oxides of chromium, combination of zinc and chromium and combination of zinc and aluminum located upstream from the second solid sulfur removal metal oxide compound for reaction with reduced sulfur compound.

Any suitable reactor geometry and arrangement may be used in contacting the solid sulfur removal metal oxide compound with the reduced sulfur containing gas. Preferably, solids of particle size permitting passage of the gas stream with relatively low pressure drop through the solids bed is used. For example, solid particles having average particle size of about +10 to about ¼ inch and preferably about ⅛ inch to about ¼ inch are suitable. The temperature at the gas stream—solids interface should be higher than 400° F., since at lower temperatures the reaction kinetics are too slow. The upper temperature limit for reaction of the reduced sulfur compound with the solid sulfur removal metal oxide compound when a zinc containing compound is used, is restricted by the partial pressure of zinc becoming higher than desired. The upper limit of temperature in the reduced sulfur compound removal step is also limited by the amount of steam present in the gas stream. Based upon data using hydrogen sulfide, when the gas stream has a $H_2O/S^{2-}$ weight ratio of less than about 5, temperatures of about 1000° to about 1600° F. are preferred and when the gas stream has an $H_2O/S^{2-}$ weight ratio of between about 5 and about 30, temperatures of about 400° to about 1000° F. are preferred. Zinc aluminate compounds appear to tolerate higher $H_2O/S^{2-}$ weight ratios, such weight ratios between about 20 and about 1000, preferably being operated for the reaction of reduced sulfur compound at about 400° to about 1000° F. It is preferred that the reduced sulfur compound reaction be carried out under conditions such that the above named solid sulfur removal metal oxide compounds react with greater than about 65 mole percent of the reduced sulfur compound present in the gas stream. The pressure under which the reaction of reduced sulfur compound and the solid sulfur removal metal oxide compound is carried out does not appear to have an influence on the reaction.

Reaction of the reduced sulfur compound in the gas stream with the named solid sulfur removal metal oxide compound is believed to proceed according to the following exemplary chemical reactions using $H_2S$:

$$Cr_2O_3 + H_2S \rightarrow Cr_2S_3 + 3H_2O \qquad \text{I.}$$

$$ZnAl_2O_4 + H_2S \rightarrow ZnS + Al_2O_3 + H_2O \qquad \text{II.}$$

$$ZnCr_2O_4 + H_2S \rightarrow ZnS + Cr_2O_3 + H_2O \qquad \text{III.}$$

However, the inventors do not want to be bound by mechanisms of the above or any specified postulated chemical reactions in connection with their process.

The sulfided solid sulfur removal metal oxide compound is regenerated by contacting it with oxygen containing gas at temperatures of about 1400° to about 2400° F. When zinc oxide compounds are used, it is preferred to regenerate at temperatures above 1600° F. since below this temperature zinc sulfate formation is enhanced and reduces the sulfur removal properties on recycle, producing materials which do not form elemental sulfur under conditions of this process. Preferred temperatures for regeneration are about 1800° to about 2100° F.

During the regeneration cycle, at least 10 weight percent of the sulfur removed is in the form of elemental sulfur, preferably greater than 30 weight percent of the sulfur removed is in the form of elemental sulfur. Generally about 30 to about 50 weight percent of the sulfur from the reduced sulfur compound removed on regeneration is in the form of elemental sulfur. The elemental sulfur may be increased by recycle of the regenerating off-gas through the regenerating process. Recycle also aids in temperature control of exothermic reactions in the regeneration cycle. The regeneration cycle is preferably carried out at low pressure, preferably less than 2 atmospheres. It is preferred that the regenerating oxygen containing gas stream be passed through the solid sulfur removal metal oxide compound bed countercurrent to the direction of flow of the reduced sulfur compound containing gas stream.

The oxygen containing gas used for regeneration may be any gas containing significant amounts of oxygen while not containing substantial amounts of interfering or competing chemicals for reaction with the sulfided solid sulfur removal metal oxide compounds or regeneration reaction products. An oxygen containing stream of helium or nitrogen may be used, air may be used, and sulfur dioxide containing gas streams may be used to enhance elemental sulfur production upon regeneration.

The regeneration reactions are postulated as follows, corresponding to the above sulfur removal reaction, respectively:

$$Cr_2S_3 + 3/2 SO_2 \rightarrow Cr_2O_3 + 9/4 S_2 \qquad \text{IV.}$$

$$ZnS + Al_2O_3 + \tfrac{1}{2}SO_2 \rightarrow ZnAl_2O_4 + \tfrac{3}{4}S_2 \qquad \text{V.}$$

$$ZnS + Cr_2O_3 + \tfrac{1}{2}SO_2 \rightarrow ZnCr_2O_4 + \tfrac{3}{4}S_2 \qquad \text{VI.}$$

While the above process description has referred to a single reactor containing beds which may be operated on a sulfur removal cycle and on a regenerating cycle, it is clear that the process of this invention may be performed on a continuous basis by having multiple beds, some of which may be operated on sulfur removal cycles while others are being operated on regenerating cycles.

The process of this invention may be operated over a large number of cycles while still remaining effective. The process of this invention provides high temperature fuel gas desulfurization for improving thermal efficiency of energy conversion processes, such as coal gasification. The process of this invention does not consume hydrogen nor other useful gases, such as fuel gases, nor does it consume valuable fuels such as coke or fuel gases. The elemental sulfur produced by the process of this invention is much greater than that derived by prior methods of controlling the rate of oxidation.

The following specific examples are set forth as exemplary of specific embodiments of this invention and use of specific materials and conditions and is not meant to limit the invention in any way.

EXAMPLE I

A quartz reactor was charged with a bed of 25.76 grams solid sulfur removal metal oxide compound made up of a mixture of 57.09 mole percent $ZnAl_2O_4$, 31.04 mole percent $ZnCr_2O_4$, and 11.87 mole percent $Al_2O_3$. The particle size was −40 to +60 mesh, the surface area 56 square meters/gram and the bulk density 97 pounds per cubit foot. The solids were heated to 1200° F. and a gas stream having a composition of 20 volume percent $H_2S$ and 80 volume percent helium was passed through the bed of solids for 77 minutes at a flow rate of 222 standard cubic centimeters/minute. The amount of $H_2S$ in the exhaust gas was measured and it was found that 3.01 grams $H_2S$ reacted with the solids, representing removal of 57.8 weight percent of $H_2S$ in the gas stream.

The sulfided solids were regenerated by heating to 1600° F. and passing gas having a composition of 24.1 volume percent oxygen and 75.9 volume percent helium through the bed of solids at a flow rate of 230 standard cubit centimeters/minute for 73 minutes. The $SO_2$ and elemental sulfur produced were collected and measured. The total sulfur removal was 93 weight percent of the sulfur reacted with the solids and of the sulfur removed 31.9 weight percent was in the form of elemental sulfur.

EXAMPLE II

The $H_2S$ removal from a gas stream as described in Example I was repeated with the same materials and under the same conditions. Upon regeneration of the sulfided solids 33.6 percent of the sulfur removed was in the form of elemental sulfur.

EXAMPLE III

A reactor as described in Example I was charged with a 10 gram bed of calcined solids having the composition 18 mole percent $ZnCr_2O_4$ and 82 mole percent ZnO having a particle size of −40 to +60 mesh, surface area 11 square meters/gram and bulk density of 112 pounds/cubic foot. The solids were heated to 1400° F. and a gas stream having a composition of 2.4 volume percent $H_2S$ and 97.6 volume percent He was passed through the bed of solids for 120 minutes at the flow rate of 1260 scc/m. The amount of $H_2S$ reacted with the solids was 1.08 grams, representing removal of 20.9 percent of $H_2S$ in the gas stream.

The sulfided solids were regenerated by heating at 1800° F. and passing gas having a composition of 43.7 volume percent $SO_2$ and 56.3 volume percent $N_2$ through the bed of solids at a flow rate of 207 scc/m for 300 minutes at atmospheric pressure. Since $SO_2$ was used as the oxidant, elemental sulfur was the only product. Elemental sulfur recovered was 1.62 grams.

EXAMPLE IV

A reactor as described in Example I was charged with a 10.034 gram bed of solids having the composition 67.4 mole percent $ZnAl_2O_4$ and 32.6 mole percent $Al_2O_3$ having a particle size of −40 to +60 mesh, surface area 30 square meters/gram and bulk density of 80 pounds/cubic foot. The solids were heated to 1400° F. and subjected to a gas stream having the properties, flow rate and time described in Example III. The amount of $H_2S$ reacted with the solids was 1.10 grams, representing removal of 21.2 percent of $H_2S$ in the gas stream.

The sulfided solids were regenerated under the same conditions set forth in Example III and 1.625 grams of elemental sulfur was recovered.

EXAMPLE V

A reactor as described in Example I was charged with a 9.9834 gram bed of solids having the composition 13.6 mole percent $Cr_2O_3$ and 86.4 mole percent $Al_2O_3$ having a particle size of −40 to +60 mesh, surface area 80 square meters/gram and bulk density of 72 pounds/cubic foot. The solids were heated to 1400° F. and subjected to a gas stream having the properties, flow rate and time described in Example III. The amount of $H_2S$ reacted with the solids was 1.25 grams, representing removal of 24 percent of $H_2S$ in the stream.

The sulfided solids were regenerated under the same conditions set forth in Example III and 1.85 grams of elemental sulfur was recovered.

EXAMPLE VI

A reactor as described in Example I was charged with a 25.53 gram bed of solids having the composition 31.04 mole percent $ZnCr_2O_4$ and 57.09 mole percent $ZnAl_2O_4$ and 11.87 mole percent $Al_2O_3$ having a particle size of −40 to +60 mesh, surface area 56 square meters/gram and bulk density of 97 pounds/cubic foot. The solids were heated to 1400° F. and a gas stream having a composition of 21.1 volume percent $H_2S$ and 78.9 volume percent He was passed through the bed of solids for 68 minutes at the flow rate of 227 scc/m. The amount of $H_2S$ reacted with the solids was 2.55 grams, representing removal of 54.7 percent of $H_2S$ in the gas stream.

The sulfided solids were regenerated by heating at 1800° F. and passing gas having a composition of 18 volume percent $SO_2$ and 82 volume percent He through the bed of solids at a flow rate of 216 scc/m for 27 minutes. The amount of sulfur appearing as elemental sulfur in the product gas averaged 72.3 weight percent. A second repeated run under the same conditions resulted in elemental sulfur in the product gas of an average of 36 weight percent.

EXAMPLE VII

Multicycle testing of zinc aluminate was performed by sulfidation of zinc aluminate at 1400° F. with a hydrogen-free, steam-free $H_2S$ containing gas. The amount of $H_2S$ reacted was determined by recovering the $H_2O$ produced in a magnesium perchlorate trap and weighing it. Regeneration of the sulfided zinc aluminate was carried out by flowing a stream of $SO_2$ across the sulfided zinc aluminate at 1780° F. Elemental sulfur was quantitated by weighing following collection in a knockout vessel immersed in a dry ice-acetone bath at −109° F. Forty-four cycles were performed; cycles 1–10 averaging about 45 percent utilization of zinc aluminate and cycles 11–44 about 30 percent utilization of zinc aluminate. After 38 cycles, the surface area of zinc aluminate dropped from 30 $M^2$/gm to 1 $M^2$/gm but the extent of reaction between zinc aluminate and $H_2S$ dropped less than 50 percent. Both the reaction of H₂S and the sulfur produced on regeneration, expressed on a per surface area of zinc aluminate basis, increased about fourfold.

EXAMPLE VIII

Another multicycle test was conducted in the manner described in Example VII except that the sulfidation gas was a steam-free, hydrogen and H₂S containing gas. With the hydrogen containing sulfidation gas, the zinc aluminate utilization was about twice the utilization for H₂S reaction found under the same conditions as described in Example VII. Hydrogen appears to improve the kinetics of the sulfidation reaction.

Comparative runs were made in the same manner as described in Example I wherein only solid materials having a composition of greater than 99 mole percent ZnO, particle size 40 to 60 mesh, was subjected at 1400° F. to a gas stream having the same composition as described in Example I for 180 minutes at a flow rate of 225 scc/m with a total 10.5 grams of H₂S reacted with ZnO. The sulfided ZnO solids were then heated to 180° F. and a gas stream of 23 volume percent oxygen and 77 volume percent helium passed through the bed at a flow rate of 220 scc/m for 210 minutes for regeneration. The amount of sulfur removed from the regeneration gas stream as elemental sulfur in five separate runs was: 0.6 weight percent, 1.6 weight percent, 0.5 weight percent, 1.1 weight percent and 0.1 weight percent of the sulfur in the regeneration gas stream showing the combination of zinc and chromium and combination of zinc and aluminum, as opposed to ZnO, is necessary for substantial elemental sulfur production.

Further comparative runs were made in the reactor described in Example I in which ZnAl₂O₄ and ZnCr₂O₄ beds of about 25 grams were heated to 1800° F. and a gas having a composition of 20 volume percent SO₂ and 80 volume percent He was passed through the bed of solids at a flow rate of 222 scc/m for 22 minutes at atmospheric pressure. No detectible elemental sulfur was found in the product gas showing that sulfided ZnAl₂O₄ or ZnCr₂O₄ was responsible for the elemental sulfur production.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:
1. A process for desulfurization of gas streams comprising reduced sulfur compound with production of elemental sulfur comprising:
   passing said gas stream in contact with solid sulfur removal metal oxide compound selected from the group consisting of chromia, zinc chromite, zinc aluminate, and mixtures thereof at temperatures about 400° to about 1600° F. for reaction of said reduced sulfur compound with said solid metal oxide producing sulfided sulfur removal compound; and
   regenerating said sulfided compound by contacting said sulfided compound with oxygen containing gas at temperatures about 1600° to about 2400° F. to produce said sulfur removal metal oxide compound and at least 10 weight percent of the sulfur removed being in the form of elemental sulfur.

2. The process of claim 1 wherein said solid sulfur removal metal oxide compound comprises chromia.

3. The process of claim 1 wherein said solid sulfur removal metal oxide compound comprises zinc chromite.

4. The process of claim 1 wherein said solid sulfur removal metal oxide compound comprises zinc aluminate.

5. The process of claim 1 wherein said solid sulfur removal metal oxide compound is used with a second solid sulfur removal metal oxide compound selected from the group consisting of alumina, zinc oxide, iron oxide, magnesium oxide, calcium oxide and mixtures thereof, said solid sulfur removal metal oxide compound being present in greater than a 2 to 1 Molar ratio with said second solid sulfur removal metal oxide compound.

6. The process of claim 5 wherein said solid sulfur removal metal oxide compound and said second solid sulfur removal metal oxide compound are mixed in a single bed.

7. The process of claim 5 wherein said solid sulfur removal metal oxide compound and said second solid sulfur removal metal oxide compound are maintained in separate beds, said solid sulfur removal metal oxide compound bed being located upstream of said second solid sulfur removal metal oxide compound for said reaction of reduced sulfur compound.

8. The process of claim 7 wherein said solid sulfur removal metal oxide compound being located downstream of said second solid sulfur removal metal oxide compound for said regenerating.

9. The process of claim 1 wherein said regenerating gas is passed countercurrent to said gas stream passed for said reaction with said reduced sulfur compound.

10. The process of claim 1 wherein said gas stream has a H₂O/S²⁻ weight ratio of less than about 5 and said temperature for said reaction of reduced sulfur compound is about 1000° to about 1600° F.

11. The process of claim 1 wherein said gas stream has a H₂O/S²⁻ weight ratio of between about 5 and about 30 and said temperature for said reaction of reduced sulfur compound is about 400° to about 1000° F.

12. The process of claim 1 wherein said solid sulfur removal metal oxide compound comprises combination of zinc and aluminum, said gas stream has a H₂O/S²⁻ weight ratio between about 20 and about 1000 and said temperature for said reaction of reduced sulfur compound is about 400° to about 1000° F.

13. The process of claim 1 wherein said solid sulfur removal metal oxide compound reacts with greater than about 65 mole percent of said reduced sulfur compound present in said gas stream.

14. The process of claim 1 wherein said regeneration of said sulfided compound is carried out at about 1800° to 2100° F.

15. The process of claim 1 wherein at least about 30 weight percent of the sulfur removed is in the form of elemental sulfur.

16. The process of claim 15 wherein about 30 to about 50 weight percent of the sulfur removed is in the form of elemental sulfur.

17. The process of claim 1 wherein said oxygen containing gas comprises air.

18. The process of claim 1 wherein said oxygen containing gas comprises SO₂.

19. The process of claim 1 wherein said elemental sulfur is removed from off-gas of regeneration and said off-gas is recycled to said regenerating reaction.

20. The process of claim 1 or 2 or 3 or 4 or 5 or 6 or 7 or 8 or 9 or 10 or 11 or 12 or 13 or 14 or 15 or 16 or 17 or 18 or 19 wherein said reduced sulfur compound comprises H₂S.

* * * * *